United States Patent [19]

Ronkainen et al.

[11] 4,207,276
[45] Jun. 10, 1980

[54] EASILY MAINTAINED BUBBLE-CAP COLUMN FOR THE DISTILLATION OF CLOGGING AND HIGH-SEDIMENT LIQUIDS

[75] Inventors: Pentti P. Ronkainen, Espoo; Olavi A. Leppänen, Vantaa; Kyösti T. Vento; Heimo K. Pesonen, both of Rajamäki, all of Finland

[73] Assignee: Oy Alko Ab, Helsinki, Finland

[21] Appl. No.: 948,592

[22] Filed: Oct. 4, 1978

[30] Foreign Application Priority Data

Oct. 14, 1977 [FI] Finland .................... 773048

[51] Int. Cl.² ............................................... B01F 3/04
[52] U.S. Cl. ...................... 261/114 A; 202/158; 202/267 R; 202/270; 203/86; 203/DIG. 22; 261/114 TC
[58] Field of Search ...... 261/114 A, 114 JP, 114 VT, 261/114 TC, 112, DIG. 72; 55/435; 202/158, 267 R, 270; 203/86, DIG. 22

[56] References Cited

U.S. PATENT DOCUMENTS

| | | | |
|---|---|---|---|
| 2,338,446 | 1/1944 | Lambert | 261/114 A |
| 2,797,907 | 7/1957 | De Bie | 261/114 A |
| 2,867,425 | 1/1959 | Teller | 202/158 X |
| 3,064,955 | 11/1962 | Boutte | 202/158 X |
| 3,771,434 | 11/1973 | Davies | 261/112 X |
| 4,059,877 | 11/1977 | Powers | 261/114 A X |

FOREIGN PATENT DOCUMENTS

1165550  3/1964  Fed. Rep. of Germany ...... 261/114 A

*Primary Examiner*—Richard L. Chiesa
*Attorney, Agent, or Firm*—Frank J. Jordan

[57] ABSTRACT

A bubble-cap column for the distillation of high-sediment or clogging liquids is disclosed, in which the bubble-cap structures comprising a bubble-cap and a neck are detachable and removable from the column and lined with polytetrafluoroethylene.

2 Claims, 2 Drawing Figures

EASILY MAINTAINED BUBBLE-CAP COLUMN FOR THE DISTILLATION OF CLOGGING AND HIGH-SEDIMENT LIQUIDS

BACKGROUND OF THE INVENTION

The present invention relates to an easily maintained bubble-cap column, especially for the distillation of clogging and high-sediment liquids.

The distillation of liquids which have a high sediment content and/or tend to clog the distillation column causes problems in several areas of industry. Perforated column plates are recommended for use in the distillation of such "foul" liquids. The more difficult the liquid is to handle—with a tendency to polymerize or burn onto the apparatus—the larger (up to ½") the perforations in the plates are made (Pyle, C., in Distillation in Practice, Ed. Nielsen, C. H., Reinhold Publishing Corp., New York 1956, pp. 13, 14; Hengstebeck, R. J., Distillation Principles and Design Procedures, Reinhold Publishing Corp., New York 1961, pp. 45–47). In special cases the diameter of the perforations in the plates can be made up to 2-3 cm, in which case the rest of the column structure must be modified accordingly (Billet, R., Industrielle Destillation, Verlag Chemie, Weinheim 1973, p. 333). During distillation, as the perforation size and the number of open perforations gradually decreases owing to clogging, the vapor consumption of the column increases and its separation capacity drops. In this case the column must be cleaned at some stage. The specific advantage of a perforated column plate is that it is relatively easy to clean owing to its simple structure. Perforated plates have, however, one significant drawback. The liquid under distillation does not remain on the plates but flows down if vapor pressure in the column drops sufficiently even for a moment (van Winkle, M., Distillation, McGraw-Hill Book Comp., New York 1967, p. 489), and thereby there is a risk of the vapor-liquid balance being disturbed in the column and of the distilled liquids passing into waste water through the floor of the column. Even though the latter possibility can be effectively prevented by current control techniques, even a short complete vapor cutoff in a perforated-plate column always causes a long stoppage in distillation as the liquids escape from the plates. The refilling of the column and the re-establishing of the vapor-liquid balance require both additional energy and time. Bubble-cap columns are significantly more stable in corresponding cases of vapor pressure disturbance, since in a correctly constructed bubble-cap column the liquid will not flow down when vapor pressure drops but will remain on the plates. The pressure having returned to normal, distillation can be continued after a rather short balancing. It is because of this improved stability—compared with perforated-plate columns—that bubble-cap columns are used in industry for the distillation of clogging liquids (Kretzschmar, H., Hefe and Alkohol sowie andere Gärungsproduke, Springer-Verlag, Berlin, Göttingen, Heidelberg 1955, p. 435), even though bubble-cap plate structures are complicated and, after clogging, the job of cleaning them is time-consuming and the results of this cleaning are often moderate at best. The effectiveness of the cleaning can be observed from the pressure losses after the distillation apparatus has been restarted, the losses being clearly higher after unsuccessful cleaning than in a new, completely clean column of the same type. The higher the pressure losses after cleaning, the shorter will be the next distillation period before new cleaning. This causes many disadvantages, such as waste of energy (extra pressure losses require additional vaporization), a shortening of the effective operating period of the distillation unit, lowering of the capacity, and additional waste water load due to frequently repeated washes. In order to eliminate these drawbacks, the present invention relates to a more advanced bubble-cap column, in which the distillation periods of high-sediment and clogging liquids are many times longer than those of corresponding other bubble-cap columns used for the same purpose. In addition, the column can, when needed, be cleaned quickly and so thoroughly that the operating periods of the unit are not shortened in comparison with operating periods observed using a new and fully clean unit.

It is generally known that it is possible to eliminate or substantially diminish the sedimentation, on the inner surfaces of a reactor, of materials which are produced as a result of various chemical reactions and are insoluble in the reaction medium, by coating the inner surfaces of the reactor with polytetrafluoroethylene. Such coatings, however, wear off and therefore must be periodically renewed, which has proven to be very difficult and time-consuming.

Therefore the object of the present invention is to provide a bubble-cap column which is easier to maintain than previous ones, which can be used for longer periods without interruption for cleaning, and which is easier and quicker to clean.

SUMMARY OF THE INVENTION

According to the present invention there is provided a column having detachable means comprising bubble caps and necks removable from the column, the inner surfaces of the bubble caps and the inner and outer surfaces of the bubble-cap necks being coated with a polytetrafluoroethylene type substance from which sediments agglomerating on said surface become detached by themselves under their own weight or can be easily detached when cleaned outside the column.

In the experiments leading to the invention it was observed that especially when distilling high-sediment fermented graim wort, clogging of the plates is produced by high-sediment draff splashing and frothing onto the bubble-caps and bubble-cap necks from the plate below. Draff also agglomerates on the outer surfaces of bubble-cap necks which are above the liquid surfaces on the plates, as a result of frothing and splashing of the boiling liquid and fluctuations in the liquid level. Hot vapor dries the agglomerating draff into a hard "cake". These agglomerates continue to grow until the column is clogged to such an extent that it requires cleaning. It has been observed that in this case the agglomerated draff is dark, partly carbonated, and adheres strongly to the metal surfaces.

This observation has been exploited in the present invention by providing a bubble-cap column in which the points most critical in terms of clogging, i.e. the bubble caps and the bubble-cap necks, have been fitted to the column so that they can be detached from the column for cleaning. It was also shown that the inner surfaces of the bubble caps and the inner and outer surfaces of the bubble-cap necks could be coated with tetrafluoroethylene or a similar substance simply and without the drawbacks encountered in previously known devices, since the surface to be coated was relatively small and the coating or recoating could be performed outside the bubble-cap column after the cleaning. Thus the shut-down time of the column could be shortened. In addition, it was possible to use two sets of bubble caps and bubble-cap necks, which further shortened the shut-down time.

By coating the most critical metal surfaces—the inner surfaces of the bubble caps and the inner and outer surfaces of the bubble-cap necks—with polytetrafluoroethylene, or PTFE, or by other similar substances, an advantage is gained in the column in accordance with the present invention in that, as the froth agglomerates on the said coated surfaces gradually increase, they become detached from the PTFE surface under their own weight and thus these most critical parts of the column are "automatically" unclogged. In addition to PTFE, other substances that can be used for the coating include polyvinylidene fluoride (PVDF), polychlorotrifluoroethylene (PCTFE), tetrafluoroethyleneperfluoropropylene (FER), and perfluoralcoxycopolymer (PFA).

With respect to the washing of the column and the checking and possible renewal of the coating, the bubble caps and bubble-cap necks have been made detachable. At each vertical interval between the sets of plates there is, for this purpose, a sufficiently large opening, closable by means of a hatch, through which the bubble caps can be taken out and returned in rows by means of bars linking the bubble caps together. The agglomerates on the bubble-cap structures are easily accessible outside the column and the froth can be detached without difficulty from the coated areas with the aid of a wooden spatula or a light wash, and from other areas in the bubble-cap structure it detaches by itself by splitting after a sufficient drying period. The waste sediment can, when the bubble caps are cleaned, be placed in a waste bin, for example, and thus this sediment will not constitute an additional load in waste water as in earlier columns, in which the bubble caps are washed inside the column. A duplicate is made for each bubble cap structure (bubble cap and bubble-cap neck) and thus distillation stoppage time can be minimized regardless of whether the stoppage is for the cleaning of the bubble-cap structures or of the entire distillation unit, for the inspection of the PTFE coating of the bubble caps and the bubble-cap necks, or for recoating.

DESCRIPTION OF THE DRAWINGS

In the accompanying drawings, a section of a preferred embodiment of a bubble-cap distillation column according to the invention is illustrated, FIG. 1 as a vertical cross section and
FIG. 2 as a horizontal section.

DESCRIPTION OF THE PREFERRED EMBODIMENT

Figure 1:
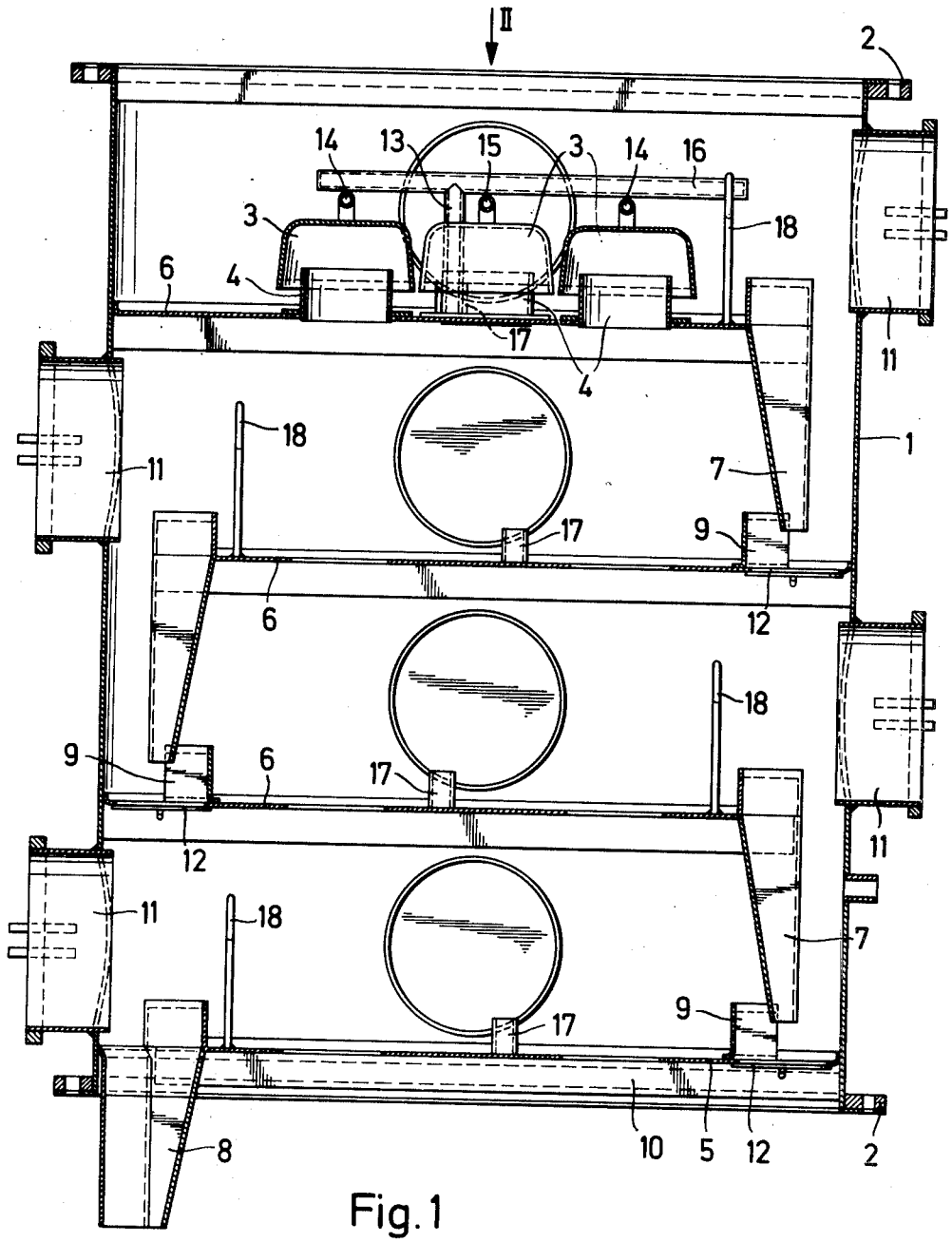
Figure 2:
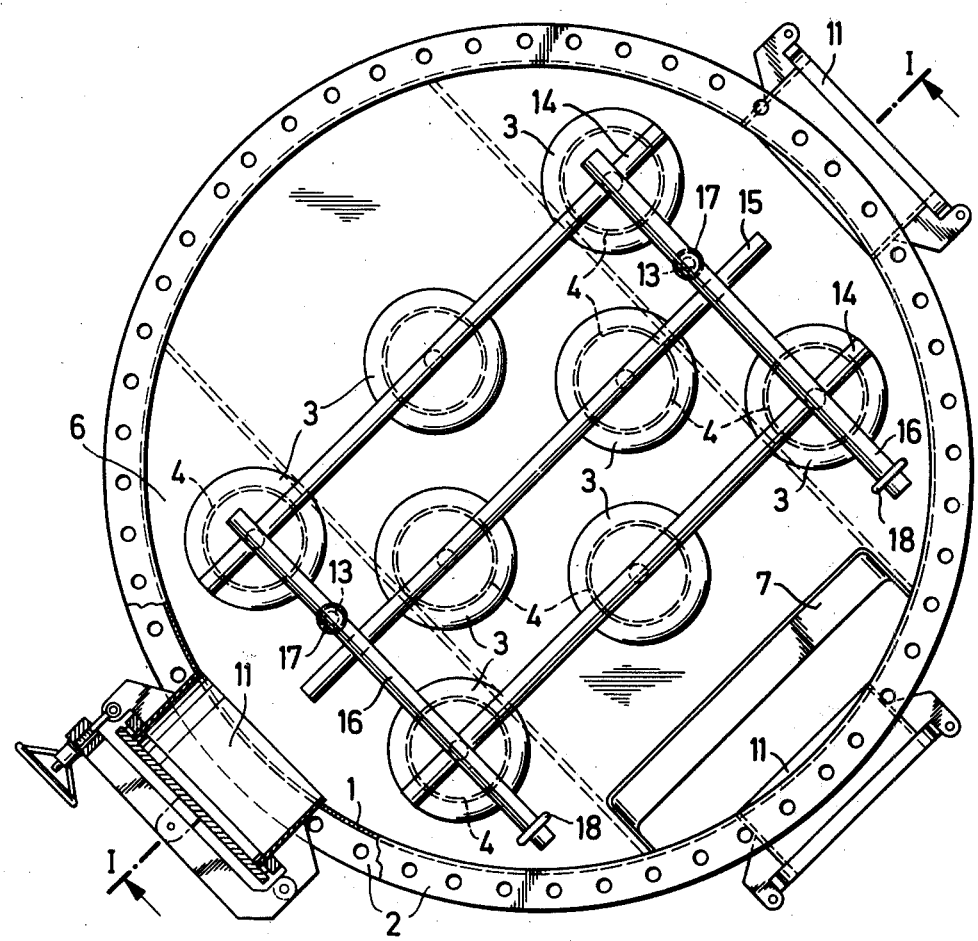

Reference numeral 1 indicates the outer mantle of the column and 2 indicates the flanges at its ends; the column units are placed one on top of the other to bear on the flanges. Numeral 5 indicates the floor of the column unit and 6 its plates. A number of bubble caps 3 have been placed at each layer of the column, and vapor rises through the bubble caps, from bubble-cap necks 4. For the sake of simplicity, FIG. 1 shows the bubble-cap series of only the top level. Numerals 7 and 8 indicate overflow troughs and 9 the inlet gate. Part 10 is the support of the column floor and parts 11 and 12 are cleaning hatches. In addition, there are observation hatches in the column for each compartment, but they are not shown in the drawing.

According to the invention, the insides of the bubble caps 3 and the insides and outsides of the bubble-cap necks 4 have been coated with PTFE or some corresponding material, which prevents sediments from adhering strongly to these surfaces. In addition the bubble caps have been linked into series by means of suitable linking members 14 and 15, which in the embodiment according to the figure are bars, so that the bubble-cap structures can be detached and cleaned outside the column. Numeral 16 indicates the attachment bars linking the series, and numeral 13 indicates the attachment pipes by means of which the structure is supported to bear on the corresponding sleeves 17 in the plate 6. The bubble-cap series structure is further supported by attachment loops 18 to bear on the plate 6.

A bubble-cap series is easy to detach and change for a new, clean bubble-cap series through cleaning hatches 11, of which there is one in each interval between the plates.

What is claimed is:

1. In a bubble-cap column for the distillation of high sediment or clogging liquids including a plurality of apertured plates arranged in spaced vertical relationship, each plate having a plurality of bubble-cap structures arranged in rows thereon and each comprising a bubble-cap overlying a neck portion extending through an aperture in said plate, the improvement wherein said bubble-cap structure are readily detachable from said plates and are removable through hatches provided in said column, the inner surfaces of said bubble-cap and said inner and outer surfaces of said neck portion being coated with an organic fluorine compound to which agglomerating sediments do not readily adhere.

2. A bubble-cap column according to claim 1 in which said bubble-caps in each row are mounted on an elongate carrier for cojoint removal of said bubble-caps from said column.

* * * * *